US012719668B2

(12) United States Patent
Matthews, Jr.

(10) Patent No.: US 12,719,668 B2
(45) Date of Patent: Aug. 25, 2026

(54) AUTOMATIC KEY ROLLING FOR LINK ENCRYPTION

(71) Applicant: Advanced Micro Devices, Inc., Santa Clara, CA (US)

(72) Inventor: Donald Preston Matthews, Jr., Longmont, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 645 days.

(21) Appl. No.: 17/547,866

(22) Filed: Dec. 10, 2021

(65) Prior Publication Data

US 2023/0188336 A1 Jun. 15, 2023

(51) Int. Cl.
*H04L 9/08* (2006.01)
*H04L 9/14* (2006.01)
*H04L 9/40* (2022.01)

(52) U.S. Cl.
CPC .......... *H04L 9/0861* (2013.01); *H04L 9/0822* (2013.01); *H04L 9/14* (2013.01); *H04L 63/0428* (2013.01)

(58) Field of Classification Search
CPC ....... H04L 9/0861; H04L 9/0822; H04L 9/14; H04L 63/0428
USPC .......................................................... 713/171
See application file for complete search history.

(56) References Cited

U.S. PATENT DOCUMENTS 7,995,758 B1 * 8/2011 Shapiro ..................... H04L 9/12 380/278
10,735,398 B1 * 8/2020 Covati ................ H04L 63/0838
11,570,162 B1 * 1/2023 Mundra .............. H04L 63/0435
2007/0223706 A1 9/2007 Gantman et al.
2009/0144550 A1 6/2009 Arunan
2010/0155475 A1 * 6/2010 Paek ....................... G06F 21/34 235/439

(Continued)

FOREIGN PATENT DOCUMENTS

WO 2006078572 A2 12/2020

OTHER PUBLICATIONS

PCT/US2022/050708 , "International Search Report and Written Opinion", PCT Application No. PCT/US2022/050708, Mar. 31, 2023, 11 pages.

(Continued)

*Primary Examiner* — Teshome Hailu
(74) *Attorney, Agent, or Firm* — FIG. 1 Patents

(57) ABSTRACT

Automatic key rolling for link encryption is described. In accordance with the described techniques, data packets are encrypted at a first endpoint of a communication link using a first data encryption key. The encrypted data packets are communicated over the communication link to a second endpoint. A key rolling event that is known by both the first endpoint and the second endpoint is detected at the first endpoint. Responsive to detecting the key rolling event, the first data encryption key is rolled to a second data encryption key for encrypting data packets communicated over the communication link. In one or more implementations, the second endpoint is also configured to roll from the first data encryption key to the second data encryption key responsive to the key rolling event in order to decrypt data packets encrypted with the second data encryption key which are received from the first endpoint.

20 Claims, 5 Drawing Sheets

(56) References Cited

U.S. PATENT DOCUMENTS

| | | | | |
|---|---|---|---|---|
| 2014/0258730 | A1* | 9/2014 | Stecher | H04L 9/0861 713/189 |
| 2018/0048631 | A1* | 2/2018 | Waltermann | H04L 63/06 |
| 2018/0183592 | A1* | 6/2018 | Campagna | H04L 9/0643 |
| 2018/0337896 | A1* | 11/2018 | Frankel | H04L 9/3297 |
| 2018/0357426 | A1 | 12/2018 | Pearson et al. | |
| 2020/0067890 | A1 | 2/2020 | Frankel et al. | |
| 2020/0153625 | A1* | 5/2020 | Schaap | H04L 9/0869 |
| 2021/0075587 | A1 | 3/2021 | Alwen | |
| 2021/0218548 | A1* | 7/2021 | Abraham | H04L 63/0428 |

OTHER PUBLICATIONS

"EP Search Report", EP Application No. 22904909.3, Jun. 2, 2025, 8 pages.

* cited by examiner

500

502
Receive, at a first endpoint and a second endpoint of a communication link, a first key derivation key 504
Generate, at the first endpoint and the second endpoint, a first data encryption key and a second key derivation key by applying a key derivation function to the first key derivation key 506
Generate, at the first endpoint and the second endpoint, a second data encryption key and a third key derivation key by applying the key derivation function to the second key derivation key, wherein the first endpoint and the second endpoint are configured to roll from the first data encryption key to the second data encryption key responsive to detecting a key rolling event that is known by the first endpoint and the second endpoint

FIG. 5

AUTOMATIC KEY ROLLING FOR LINK ENCRYPTION

BACKGROUND

Encrypted data communicated over a link between endpoints is susceptible to "side-channel attacks" against the encryption engine designed to determine the key being used to encrypt and decrypt the data communicated between the endpoints. Generally, such side-channel attacks observe power usage at one of the endpoints, and use mathematical software to determine a correlation between the power usage and the input and output values. When an attacker is able to observe enough data samples, this correlation can be used to decipher the encryption key.

BRIEF DESCRIPTION OF THE DRAWINGS

The detailed description is described with reference to the accompanying figures.

FIG. 5 depicts a procedure in an example implementation of deterministically generating data encryption keys based on a first key derivation key.

DETAILED DESCRIPTION

Overview

Figure 1:
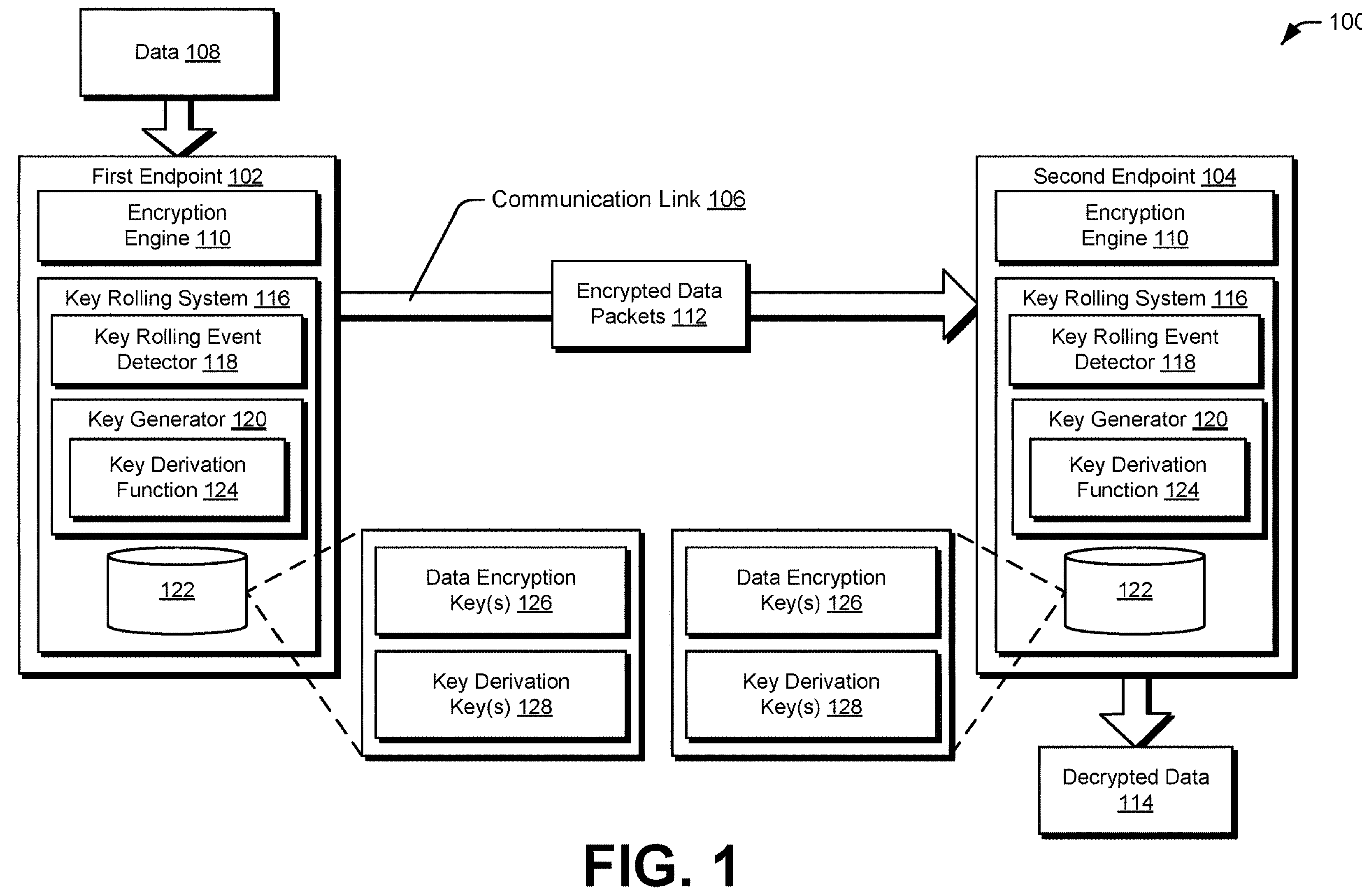
FIG. 1 is a block diagram of a non-limiting example system having a communication link between endpoints that generate keys for data encryption and roll to a next key responsive to a key rolling event known by both endpoints.

Some conventional systems attempt to prevent side-channel attacks by applying random masks to the input and output data used by the encryption engine. Generally, such masks are added to the data prior to the encryption operation and then removed after the encryption operation. However, masking the data in this way requires additional hardware in the form of masking gates as well as additional logic gates which increases the size of the device. For example, some AES cores which are resistant to side-channel attacks can be three to four times the size of a "non-protected" AES core. Moreover, it can be difficult to know the effectiveness of countermeasures, such as masking gates, until such countermeasures can be tested and measured on actual hardware by an experienced testing team.

To solve these problems, automatic key rolling for link encryption is described. The described techniques automatically perform key rolling in a defined manner such that both endpoints of a communication link can retain synchronous encryption operations while rolling the keys. In accordance with the described techniques, an encryption engine at a first endpoint and an encryption engine at a second endpoint encrypt and decrypt data communicated over the communication link using matching data encryption keys, e.g., the key used by the encryption engine at the first endpoint to encrypt data packets and form the encrypted data packets for communication over the communication link is the same as the key used by the encryption engine at the second endpoint to decrypt the encrypted data packets.

Unlike conventional systems, the keys (e.g., matching keys) used by the encryption engine at the first endpoint and the second endpoint are "rolled" in order to improve security of data handled by the first endpoint and the second endpoint and communicated across the communication link. The term "key rolling" refers to the act of replacing a key that is in use (e.g., for performing encrypting and decrypting operations) with a different key. A key rolling system deterministically generates keys for data encryption and automatically rolls to a next key responsive to a key rolling event known by the key rolling system at both the first endpoint and the second endpoint. By "known," it is meant that the event is mutually prearranged (e.g., programmatically set), such that responsive to occurrence of the event, the key rolling system at the first endpoint and the key rolling system at the second endpoint both detect the event and automatically replace a first data encryption key (e.g., an in-use key) with a second data encryption key (e.g., a not-yet-used key). In one or more implementations, for example, the mutually prearranged event corresponds to a usage event, such as number of the encrypted data packets communicated over the communication link. In such scenarios, both a key rolling event detector at the first endpoint and a key rolling event detector at the second endpoint are programmatically configured to detect when the number of data packets communicated satisfies a threshold number and to initiate key rolling in response.

Thus, as compared to conventional systems, the automatic key rolling techniques described herein improves security by preventing, or otherwise reducing an effectiveness of, attacks (e.g., "side-channel attacks") designed to determine the key being used to encrypt and decrypt data communicated between the first endpoint and the second endpoint. By rolling keys according to the described techniques, such attacks are prevented, or their effectiveness is reduced, because the described key rolling replaces keys before the attacks can collect a suitable number of samples for determining the key. In contrast to conventional key rolling techniques, the described key rolling is also significantly less burdensome on processing resources and also does not require hardware changes that, in some cases, drastically increase a physical size of components of the first endpoint and the second endpoint used for communication and data encryption and/or decryption.

In some aspects, the techniques described herein relate to a method including: encrypting data packets at a first endpoint of a communication link using a first data encryption key; communicating the encrypted data packets over the communication link to a second endpoint; detecting, at the first endpoint, a key rolling event that is known by both the first endpoint and the second endpoint; and responsive to detecting the key rolling event, rolling from the first data encryption key to a second data encryption key.

In some aspects, the techniques described herein relate to a method, further including: receiving, at the first endpoint, a first key derivation key; and generating, at the first endpoint, the first data encryption key and a second key derivation key by applying a key derivation function to the first key derivation key.

In some aspects, the techniques described herein relate to a method, wherein the second endpoint also receives the first key derivation key and generates the first data encryption key and the second key derivation key by applying the key derivation function to the first key derivation key.

In some aspects, the techniques described herein relate to a method, further including: generating, at the first endpoint, the second data encryption key and a third key derivation key by applying the key derivation function to the second key derivation key.

In some aspects, the techniques described herein relate to a method, wherein the second endpoint is configured to generate the second data encryption key and the third key derivation key by applying the key derivation function to the second key derivation key.

In some aspects, the techniques described herein relate to a method, wherein the second data encryption key and a third key derivation key are generated at the first endpoint and the second endpoint responsive to detecting the key rolling event.

In some aspects, the techniques described herein relate to a method, wherein the second data encryption key and a third key derivation key are generated at the first endpoint and the second endpoint prior to detecting the key rolling event.

In some aspects, the techniques described herein relate to a method, wherein the second endpoint is configured to roll from the first data encryption key to the second data encryption key responsive to the key rolling event.

In some aspects, the techniques described herein relate to a method, further including: encrypting, at the first endpoint, data packets using the second data encryption key; and communicating the encrypted data packets encrypted using the second data encryption key to the second endpoint over the communication link.

In some aspects, the techniques described herein relate to a method, wherein the detecting the key rolling event includes detecting that a number of data packets communicated from the first endpoint to the second endpoint satisfies a threshold number.

In some aspects, the techniques described herein relate to a method, wherein the detecting the key rolling event includes detecting that a number of flow control units of encrypted data packets communicated from the first endpoint to the second endpoint satisfies a threshold number.

In some aspects, the techniques described herein relate to a system including: a key generator to generate data encryption keys for encrypting and decrypting data packets for communication between a first endpoint and a second endpoint via a communication link; a key rolling event detector to detect a key rolling event; and an encryption engine to roll from a current data encryption key generated by the key generator to a next data encryption key generated by the key generator responsive to detection of the key rolling event by the key rolling event detector.

In some aspects, the techniques described herein relate to a system, wherein instances of the key generator, the key rolling event detector, and the encryption engine are implemented at each of the first endpoint and the second endpoint.

In some aspects, the techniques described herein relate to a system, wherein the key rolling event is known by the key rolling event detector at both the first endpoint and the second endpoint.

In some aspects, the techniques described herein relate to a system, wherein responsive to the key rolling event detector detecting the key rolling event: the encryption engine at the first endpoint encrypts data packets for communication over the communication link to the second endpoint using the next data encryption key; and the encryption engine at the second endpoint decrypts the encrypted data packets received from the first endpoint using the next data encryption key.

In some aspects, the techniques described herein relate to a method including: receiving, at a first endpoint and a second endpoint of a communication link, a first key derivation key; generating, at the first endpoint and the second endpoint, a first data encryption key and a second key derivation key by applying a key derivation function to the first key derivation key; and generating, at the first endpoint and the second endpoint, a second data encryption key and a third key derivation key by applying the key derivation function to the second key derivation key, wherein the first endpoint and the second endpoint are configured to roll from the first data encryption key to the second data encryption key responsive to detecting a key rolling event that is known by both the first endpoint and the second endpoint.

In some aspects, the techniques described herein relate to a method, wherein the key rolling event that is known by both the first endpoint and the second endpoint includes a number of data packets communicated over the communication link.

In some aspects, the techniques described herein relate to a method, further including generating, at the first endpoint and the second endpoint, at least a third data encryption key by applying the key derivation function to the third key derivation key, wherein the first endpoint and the second endpoint are configured to roll from the second data encryption key to the third data encryption key responsive to detecting a subsequent key rolling event that is known by both the first endpoint and the second endpoint.

In some aspects, the techniques described herein relate to a method, wherein the second data encryption key and the third key derivation key are generated by the first endpoint and the second endpoint responsive to the key rolling event.

In some aspects, the techniques described herein relate to a method, wherein the second data encryption key and the third key derivation key are generated by the first endpoint and the second endpoint prior to the key rolling event.

FIG. 1 is a block diagram of a non-limiting example system 100 having a communication link between endpoints that generate keys for data encryption and roll to a next key responsive to a key rolling event known by both endpoints. In particular, the system 100 includes a first endpoint 102 and a second endpoint 104. The system 100 also includes communication link 106 established between the first endpoint 102 and the second endpoint 104.

The first endpoint 102 and the second endpoint 104 correspond to devices configured to interface with each other, e.g., using the communication link 106. Examples of those devices include, by way of example and not limitation, processors (e.g., graphics processing units and central processing units), disk array controllers, hard disk drive host adapters, memory cards, solid-state drives, wireless communications hardware connections, Ethernet hardware connections, switches, bridges, and network interface controllers. It is to be appreciated that in various implementations, the first endpoint 102 and the second endpoint 104 are configured as any one or more of those devices listed just above and/or a variety of other devices without departing from the spirit or scope of the described techniques.

In accordance with the described techniques, the first endpoint 102 and the second endpoint 104 communicate over the communication link 106. In one or more implementations, the communication link 106 is bi-directional, such that the first endpoint 102 transmits data over the communication link 106 that is received by the second endpoint 104 and such that the second endpoint 104 transmits data over the communication link 106 that is received by the first endpoint 102.

Alternatively, the communication link 106 facilitates data transmission in a single direction, e.g., transmissions of data by the first endpoint 102 over the communication link 106 for receipt by the second endpoint 104 or transmissions of data by the second endpoint 104 over the communication link 106 for receipt by the first endpoint 102. In some variations where the communication link 106 facilitates data transmission in a single direction, the system 100 further includes one or more additional communication links (not shown) between the first endpoint 102 and the second endpoint 104. In at least one scenario where the communication link 106 facilitates transmission of data from the first endpoint 102 for receipt by the second endpoint 104, for instance, an additional communication link facilitates transmission of data from the second endpoint 104 for receipt by the first endpoint 102.

Alternatively or in addition, the communication link 106 facilitates data transmission in a single direction for a subset (e.g., only one) of a plurality of different types of data packets, e.g., transmissions of a first type of data by the first endpoint 102 over the communication link 106 for receipt by the second endpoint 104, transmissions of a second type of data by the first endpoint 102 over the communication link 106 for receipt by the second endpoint 104, transmissions of a third type of data by the first endpoint 102 over the communication link 106 for receipt by the second endpoint 104, and so forth.

By way of example, Peripheral Component Interconnect Express, commonly abbreviated as PCIe, is used to interface the first endpoint 102 and the second endpoint 104, in one or more implementations. In some variations where the first endpoint 102 and the second endpoint 104 communicate using PCIe sessions established between those devices, at least one PCIe session has three sub-sessions, e.g., each sub-session for communicating a different type of data. Moreover, each of those sub-sessions has a transmit link and a receive link. It follows then that a first sub-session of the three sub-sessions of a single PCIe session has a transmit link (e.g., the communication link 106) via which the first endpoint 102 transmits data for receipt by the second endpoint 104, and the first sub-session also has a receive link (e.g., an additional communication link, not shown) via which the first endpoint 102 receives data transmitted by the second endpoint 104. Other examples of interfaces used to connect the first endpoint 102 and the second endpoint 104 for communication over the communication link 106 include, by way of example and not limitation, Compute Express Link (CXL), inter-chip Global Memory Interconnect (xGMI), and NVLink. It is to be appreciated that in one or more implementations the first endpoint 102 and the second endpoint 104 communicate using a different interface from those mentioned just above without departing from the spirit or scope of the described techniques.

In accordance with the described techniques, the first endpoint 102 and the second endpoint 104 include an encryption engine 110. Broadly, the encryption engine 110 encrypts and decrypts data for communication over the communication link 106 using one or more keys. In one or more implementations, the encryption engine 110 also authenticates encrypted data and checks authentication of decrypted data. In one or more implementations, the encryption engine 110 is configured according to, or otherwise includes one or more components that utilize, the advanced encryption standard (AES) for encryption and decryption operations.

In a scenario where the first endpoint 102 corresponds to the transmitting device and the second endpoint 104 corresponds to the receiving device, the first endpoint 102 receives data 108 for communication to the second endpoint 104. The encryption engine 110 at the first endpoint 102 encrypts the data 108 and authenticates it. The first endpoint 102 (e.g., a transmitter of the first endpoint 102) transmits encrypted data packets 112, which are formed based on the encrypted and authenticated data 108 output by the encryption engine 110. The second endpoint 104 receives the encrypted data packets 112. The encryption engine 110 at the second endpoint 104 decrypts the encrypted data packets 112 and checks the authentication to form decrypted data 114. Notably, the decrypted data 114 is the same as the data 108.

In scenarios where the second endpoint 104 corresponds to the transmitting device and the first endpoint 102 corresponds to the receiving device, the data flows in the opposite direction as the scenario described above, e.g., the second endpoint 104 receives the data 108, the encryption engine 110 at the second endpoint 104 encrypts and authenticates the data 108, the second endpoint transmits the encrypted data packets 112 over the communication link 106 to the first endpoint 102, and the encryption engine 110 at the first endpoint 102 decrypts the encrypted data packets 112 and checks the authentication to output the decrypted data 114.

As noted above, the encryption engine 110 encrypts and decrypts the data using one or more data keys, e.g., data encryption keys. In accordance with the described techniques, the encryption engine 110 at the first endpoint 102 and the encryption engine 110 at the second endpoint 104 encrypt and decrypt data communicated over the communication link 106 using matching data encryption keys, e.g., the key used by the encryption engine 110 at the first endpoint 102 to encrypt the data 108 and form the encrypted data packets 112 for communication over the communication link 106 is the same as the key used by the encryption engine 110 at the second endpoint 104 to decrypt the encrypted data packets 112.

As discussed above and below, the keys (e.g., matching keys) used by the encryption engine 110 at the first endpoint 102 and the second endpoint 104 are "rolled" in order to improve security of data handled by the first endpoint 102 and the second endpoint 104 and communicated across the communication link 106. The term "key rolling" refers to the act of replacing a key that is in use (e.g., for performing encrypting and decrypting operations) with a different key. Key rolling improves security by preventing, or otherwise reducing an effectiveness of, attacks designed to determine the key being used to encrypt and decrypt data communicated between the first endpoint 102 and the second endpoint 104. By rolling keys according to the described techniques, such attacks are prevented, or their effectiveness is reduced, because the described key rolling replaces keys before the attacks can collect a suitable number of samples for determining the key. In contrast to conventional key rolling techniques, the described key rolling is also significantly less burdensome on processing resources (including processing resources that are external to the key rolling system 116, such as a processor) and also does not require hardware changes that, in some cases, drastically increase a physical size of components of the first endpoint 102 and the second endpoint 104 used for communication and data encryption and/or decryption.

In accordance with the described techniques, the first endpoint 102 and the second endpoint 104 include a key rolling system 116. In one or more implementations, the key rolling system 116 includes a key rolling event detector 118, key generator 120 and storage 122. Further, the key generator 120 includes a key derivation function 124, and the storage 122 includes one or more data encryption keys 126 and one or more key derivation keys 128. Although the key rolling system 116 is depicted separately from the encryption engine 110 in the illustrated system 100, in one or more implementations, the key rolling system 116 or one or more components of the key rolling system 116 are included as part of the encryption engine 110. Additionally or alternatively, the key rolling system 116 includes more, fewer, or different components in one or more implementations without departing from the spirit or scope of the described techniques.

Broadly, the key rolling system 116 deterministically generates keys for data encryption and automatically rolls to a next key responsive to a key rolling event known by the key rolling system 116 at both the first endpoint 102 and the second endpoint 104. By "known," it is meant that the key rolling event is mutually prearranged (e.g., programmatically set), such that responsive to occurrence of the key rolling event, the key rolling system 116 at the first endpoint 102 and the key rolling system 116 at the second endpoint 104 both detect the key rolling event and automatically replace a first data encryption key 126 (e.g., a current data encryption key that is in-use) with a second data encryption key 126 (e.g., a next data encryption key that has not yet been used). In accordance with the described techniques, the data encryption keys 126 are cryptographic keys, such as binary strings used as a secret parameter by a cryptographic algorithm, e.g., the encryption engine 110 or a component of the engine. Non-limiting examples of cryptographic keys include a random binary string of a length specified by the cryptographic algorithm and a pseudo-random binary string of the specified length. In one or more implementations, the encryption engine 110 uses the data encryption keys 126 as well as additional data to encrypt the data 108. Examples of additional data used for encryption, for example, includes initialization vectors and/or initial count values.

The key rolling event detector 118 detects such key rolling events to initiate the key rolling. It is to be appreciated that the key rolling event detector 118 detects different events to initiate key rolling in various implementations. In one or more implementations, for example, the mutually prearranged event corresponds to a usage event, such as number of the encrypted data packets 112 communicated over the communication link 106. For example, the key rolling event detector 118 detects when a number of encrypted data packets communicated satisfies a threshold number and initiates key rolling. In such scenarios, both the key rolling event detector 118 at the first endpoint 102 and the key rolling event detector 118 at the second endpoint 104 are programmatically configured to detect when the number of data packets communicated satisfies the threshold number and to initiate key rolling in response. Where the first endpoint 102 is the transmitting device and the second endpoint 104 is the receiving device, for instance, a counter of packets at the first endpoint 102 is incremented at encryption of data packet 112 and a counter of packets at the second endpoint 104 is incremented at decryption of data packet 112. Further, the key rolling event detector 118 at the first endpoint 102 detects when the number of packets transmitted as indicated by the counter of packets at the first endpoint 102 satisfies the threshold, and the key rolling event detector 118 at the second endpoint 104 detects when the number of packets received as indicated by the counter of packets at the second endpoint 104 satisfies the threshold.

Additionally or alternatively, examples of key rolling events that are detectable by the key rolling event detector 118 include, but are not limited to, a number (e.g., 128) of flow control units (FLITs) of the encrypted data communicated, a number of sectors, a number of message authentication code (MAC) tags, a MAC aggregation boundary, a value of a bit of the encrypted data (e.g., a key change or key rolling bit), an interface-particular event (e.g., a PCIe-specific event), or the number of blocks encrypted with the data encryption key (e.g., if data packets are not all uniform in size).

Responsive of detection of the key rolling event by the key rolling event detector 118, the data encryption key 126 used by the encryption engine 110 is replaced with a different data encryption key 126. In one or more implementations, the encryption engine 110 does not reuse data encryption keys 126. Instead, the encryption engine 110 obtains a new data encryption key 126 from the storage 122, e.g., as generated by the key generator 120.

In accordance with the described techniques, the key generator 120 generates the data encryption keys 126 using the key derivation function 124. In one or more implementations, the key derivation function 124 uses one or more of the key derivation keys 128 to generate the data encryption keys 126. In addition to generating the data encryption keys 126, the key derivation function 124 also generates the key derivation keys 128. By way of example, the key derivation function 124 receives as input a key derivation key 128. The key generator 120 applies the key derivation function 124 to the key derivation key 128 to deterministically generate a data encryption key 126 and a new key derivation key 128, which is used in a next key generation iteration to generate a subsequent data encryption key 126 and key derivation key 128. Because the key derivation function 124 deterministically generates keys, given the same input, the key derivation function 124 at the first endpoint 102 and the key derivation function 124 at the second endpoint 104 generate matching data encryption keys 126 and matching key derivation keys 128. In one or more implementations, the key derivation keys 128 are not updated as frequently as the data encryption keys 126. For example, the key derivation key 126 is only updated, in some implementations, by an external mechanism that set up the initial key derivation key.

To this end, a first data encryption key 126 and a second key derivation key 128 generated by the key derivation function 124 at the first endpoint 102 match a first data encryption key 126 and a second key derivation key 128 generated by the key derivation function 124 at the second endpoint 104, e.g., when the functions initially receive the same input (e.g., the first key derivation key). In accordance with the described techniques, the key derivation function 124 at the first endpoint 102 and the second endpoint 104 obtain a first key derivation key, e.g., based on establishing the communication link 106. In some conventional techniques, the encryption engine 110 generates data encryption keys, which are then used by the encryption engine 110 to encrypt data for communication over the communication link 106. In contrast to those techniques, the key derivation function 124 uses the conventional data encryption keys instead as key derivation keys.

In one or more implementations, the key derivation function 124 is implemented using a pseudo-random function and is provided at least a first key derivation key (e.g., based on establishing the communication link 106) or a next key derivation key 128 of an ordered sequence of the key derivation keys 128 (e.g., generated by the key derivation function 124) as input. As mentioned below, the key derivation function 124 is provided additional and/or different input in various implementations. One example pseudo-random function used by the key derivation function 124 is a cipher-based message authentication code (CMAC) algorithm specified in the National Institute of Standards and Technology (NIST) special publication 800-38B. CMAC is usable for authentication, and provides assurance of authenticity and integrity of the encrypted data packets 112. Another example pseudo-random function is a keyed-hash message authentication code (HMAC) algorithm specified in the Federal Information Processing Standards (FIPS) publication 198-1. It is to be appreciated that in various implementations the key derivation function 124 uses one or more different functions that deterministically generate keys without departing from the spirit or scope of the described techniques.

In one or more implementations, the key derivation function 124 invokes a pseudo-random function multiple times to generate the data encryption keys 126. In various implementations, the key derivation function 124 invokes the pseudo-random function multiple times based on different modes, examples of which include a counter mode, a feedback mode, and a double-pipeline iteration mode. In one example, and as defined in NIST 800-108, the pseudo-random function receives as input, e.g., from the key generator 120, one or more of a counter value (e.g., a 4-bit value corresponding to the key derivation key 128 that serves as the input to generate the new data encryption key 126), a label (e.g., as defined by a standard body for differentiation with other standards), a separator (e.g., a single byte with a 0×00 value), a context (e.g., stream identifier, sub-key type, and additional information), and a length (e.g., a 12-bit value) describing a length of derived key material from the 124. It is to be appreciated that the key derivation function 124 and a pseudo-random function used by the key derivation function 124 receive different inputs in various implementations.

In at least one implementation, the key derivation function 124 outputs derived key material, which is segmentable into multiple keys, e.g., a data encryption key 126 and a key derivation key 128. For example, the key generator 120 converts the key material output by the key derivation function 124 into at least a pair of cryptographic keys, e.g., a data encryption key 126 and a key derivation key 128. Alternatively or additionally, the key derivation function 124 outputs data including, but not limited to, a new data encryption key 126, a new key derivation key 128, an initialization vector, and a key-derivation-key nonce. In one or more implementations, the initialization vector is used as a counter to track a number of the encrypted data packets 112 communicated, or to track the number of data packets encrypted. One or more of these is generated from the derived key material from the key derivation function 124. In the context of generating a chain of ordered data encryption keys 126 and key derivation keys 128, such that the encryption engine 110 at the first and second endpoints 102, 104 rolls to matching data encryption keys 126 responsive to detection of a key rolling event and such that the key derivation function 124 at the first and second endpoints 102, 104 uses matching key derivation keys 128 to generate new keys, consider the following discussion of FIG. 2.

Figure 2:
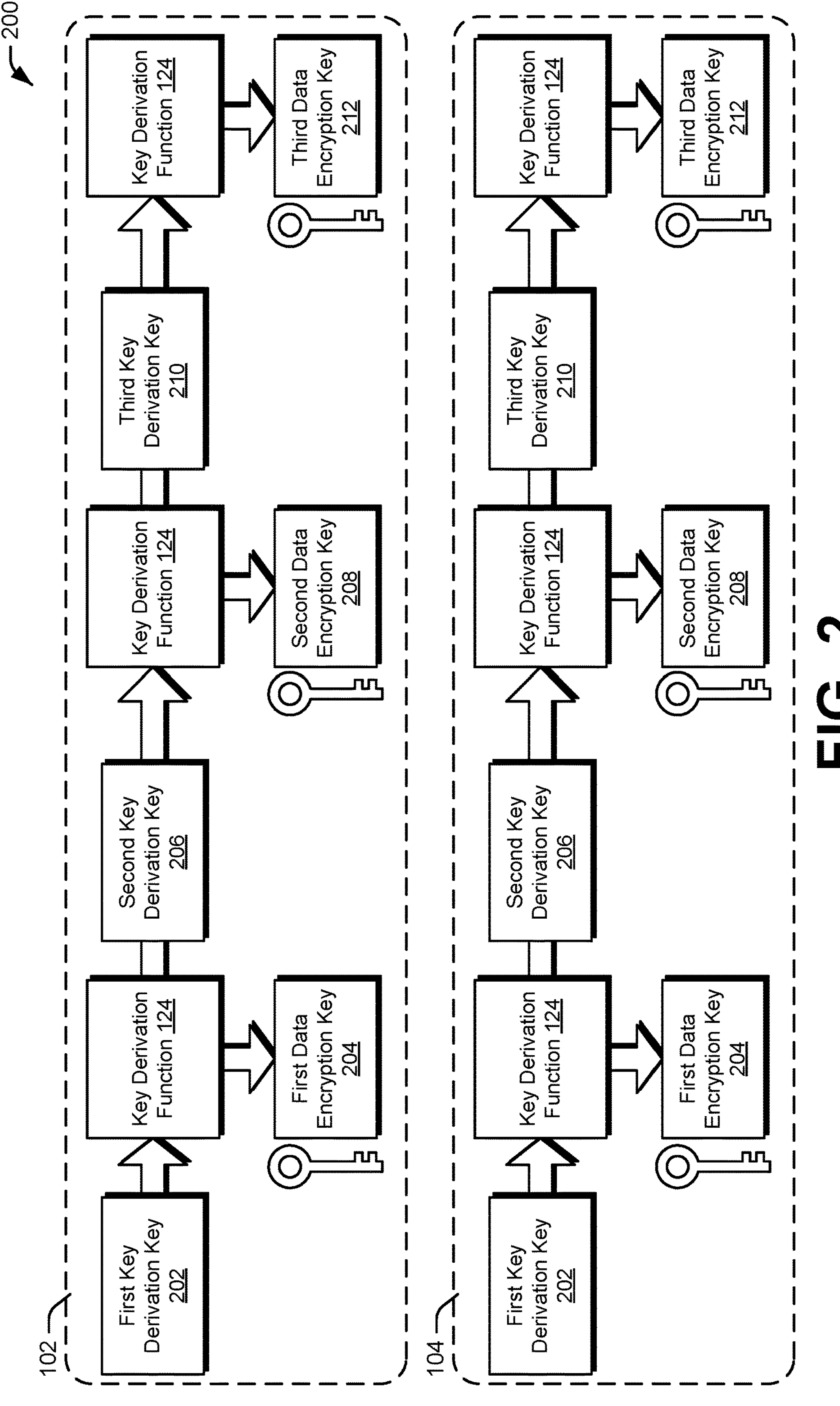
FIG. 2 depicts a non-limiting example in which a key derivation function, at both first and second endpoints across an interface, receives a same key derivation key and generates matching data encryption keys and matching key derivation keys.

FIG. 2 depicts a non-limiting example 200 in which a key derivation function, at both first and second endpoints across an interface, receives a same key derivation key and generates matching data encryption keys and matching key derivation keys.

The example 200 includes from FIG. 1 the first endpoint 102 and the second endpoint 104, depicted as dashed lines. The example 200 also includes the key derivation function 124 at the first endpoint 102 and at the second endpoint 104. The example 200 depicts the key derivation function 124 multiple times in each of the first endpoint 102 and the second endpoint 104 to represent multiple iterations of generating keys; in the example 200 three iterations of generating keys.

The key derivation function 124 at the first endpoint 102 and the key derivation function 124 at the second endpoint 104 are depicted receiving a first key derivation key 202. In one or more implementations, the first key derivation key 202 corresponds to a key provided by the encryption engine 110 based on establishing the communication link 106, e.g., a key used in conventional techniques for encrypting data communicated over the communication link 106. Alternatively, the first key derivation key 202 corresponds to one of the key derivation keys 128 generated by the key derivation function 124 at a point in time prior to the example 200.

In accordance with the described techniques, the key derivation function 124 at the first endpoint 102 generates and outputs a first data encryption key 204 and a second key derivation key 206, which the function derives based on the first key derivation key 202. Similarly, the key derivation function 124 at the second endpoint 104 generates and outputs the first data encryption key 204 and the second key derivation key 206, which the function derives based on the first key derivation key 202. In accordance with the described techniques, the first data encryption keys 204 generated by the key derivation function 124 at the first endpoint 102 and the second endpoint 104 match each other. The second key derivation keys 206 generated by the key derivation function 124 at the first endpoint 102 and the second endpoint 104 also match each other.

Subsequently, the key derivation function 124 at the first endpoint 102 and the second endpoint 104 generates and outputs a second data encryption key 208 and a third key derivation key 210, which the function derives based on the second key derivation key 206. In accordance with the described techniques, the second data encryption keys 208 generated by the key derivation function 124 at the first endpoint 102 and the second endpoint 104 match each other. The third key derivation keys 210 generated by the key derivation function 124 at the first endpoint 102 and the second endpoint 104 also match each other. Subsequent to generation of the second data encryption key 208 and the third key derivation key 210, the key derivation function 124 at the first endpoint 102 and the second endpoint 104 generates and outputs a third data encryption key 212 and a fourth key derivation key (not shown), which the function derives based on the third key derivation key 210. In accordance with the described techniques, the third data encryption keys 212 generated by the key derivation function 124 at the first endpoint 102 and the second endpoint 104 match each other. The fourth key derivation keys (not shown) generated by the key derivation function 124 at the first endpoint 102 and the second endpoint 104 also match each other. It is to be appreciated that in operation the key derivation function 124 iterates more or fewer times than depicted to generate data encryption keys and key derivation keys for an established communication link (e.g., communication link 106) in accordance with the described techniques.

In one or more implementations, the key derivation function 124 is configured to derive multiple key sets that each include a data encryption key 126 and a key derivation key 128 before keys of one or more of those key sets are used by the encryption engine 110. In the context of FIG. 2, for example, the key derivation function 124 generates at least all of the first data encryption key 204, the second key derivation key 206, the second data encryption key 208, the third key derivation key 210, the third data encryption key 212, and the fourth key derivation key (not shown) at the first endpoint 102 and the second endpoint 104 before the first data encryption key 204 is used by the encryption engine 110, such as to encrypt the data 108 to form the encrypted data packets 112 and decrypt the encrypted data packets 112 by the receiving device. Alternatively or additionally, while the first data encryption key 204 is used by the encryption engine 110, the key derivation function 124 is used to generate at least the second data encryption key 208, the third key derivation key 210, the third data encryption key 212, and the fourth key derivation key (not shown) at the first endpoint 102 and the second endpoint 104, and the generated keys are maintained (e.g., in the storage 122) for future use, such as when a key rolling event is detected. In one or more implementations, endpoint 102 produces keys at a different time and using a different method that endpoint 104.

By way of example, the key generator 120 uses the key derivation function 124 to generate a key set including a data encryption key 126 and a key derivation key 128 based on available computing resources, e.g., available processing cycles, between communications of the encrypted data packets 112, while the data 108 is not being encrypted by the encryption engine 110, while the encrypted data packets 112 are not being decrypted by encryption engine 110 to for the decrypted data 114, and so forth. In this way, the key generator 120 uses the key derivation function 124 to generate keys before the data encryption keys 126 are needed by the encryption engine 110, prior to a respective key rolling event. It is to be appreciated that a number of key sets generated prior to use of any of those key sets varies based on various factors, including computing resource usage and a communication load on the system, without departing from the spirit or scope of the described techniques. It is also to be appreciated that in one or more implementations, the key generator 120 uses the key derivation function 124 to generate a data encryption key 126 and a key derivation key 128 on an as-needed basis, e.g., responsive to the key rolling event detector 118 detecting a key rolling event.

In accordance with the described techniques, key sets are used by the encryption engine 110 and the key derivation function 124 in an order in which those sets are generated. In the context of FIG. 2, for example, the encryption engine 110 obtains the first data encryption key 204, the second data encryption key 208, and the third data encryption key 212 for use in the order in which those keys are generated. Specifically, the encryption engine 110 obtains the first data encryption key 204 for use before the second data encryption key 208, obtains the second data encryption key 208 for use before the third data encryption key 212, and so on. In this way, the encryption engine 110 at the first endpoint 102 and the second endpoint 104 roll to use matching keys responsive to each key rolling event. Similarly, the key generator 120 provides the second key derivation key 206, the third key derivation key 210, and the fourth key derivation key (not shown) to the key derivation function 124 in the order in which those keys are generated. In this way, the key derivation function 124 at the first endpoint 102 and the second endpoint 104 use matching keys to generate next sets of keys. In the context of rolling to next keys, in an ordered sequence of keys, consider the following discussion of FIG. 3.

Figure 3:
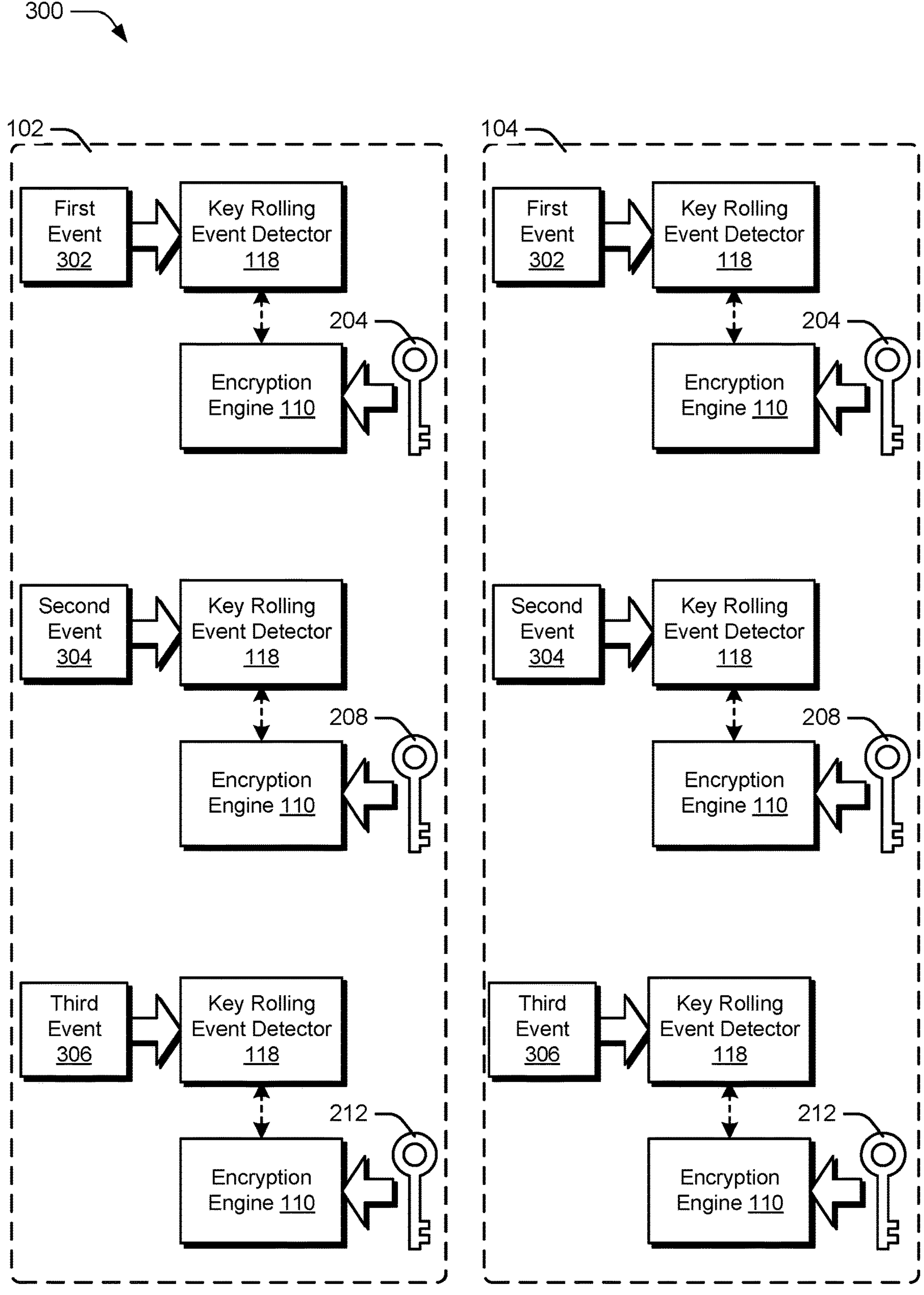
FIG. 3 depicts a non-limiting example in which a key rolling event detector, at both first and second endpoints across an interface, detects an event and initiates use of new matching data encryption keys by an encryption engine.

FIG. 3 depicts a non-limiting example 300 in which a key rolling event detector, at both first and second endpoints across an interface, detects an event and initiates use of new matching data encryption keys by an encryption engine.

The example 300 includes from FIG. 1 the first endpoint 102 and the second endpoint 104, depicted as dashed lines. The example 300 also includes the encryption engine 110 and the key rolling event detector 118 at the first endpoint 102 and at the second endpoint 104. The example 300 depicts the encryption engine 110 and the key rolling event detector 118 multiple times in each of the first endpoint 102 and the second endpoint 104 to represent multiple iterations of detecting key rolling events and obtaining a new data encryption key 126 (i.e., rolling to a next key); in the example 300 three iterations of detecting key rolling events and obtaining a new data encryption key 126).

In accordance with the described techniques, the key rolling event detector 118 at the first endpoint 102 and the key rolling event detector 118 at the second endpoint 104 detect first event 302 (a first key rolling event). Examples of key rolling events are discussed in more detail above, e.g., a number of packets communicated. Responsive to detection of the first event 302, key rolling is performed such that the encryption engine 110 obtains the first data encryption key 204 for use. In scenarios where the encryption engine 110 is already using a previous data encryption key, the previous key is replaced by the first data encryption key 204. Subsequent to the replacement, the encryption engine 110 uses the first data encryption key 204 to encrypt or decrypt data. In the context of FIG. 1, for instance, the encryption engine 110 at the first endpoint 102 uses the first data encryption key 204 to encrypt data for communication over the communication link 106, and the encryption engine 110 at the second endpoint 104 uses the first data encryption key 204 to decrypt the data received via the communication link 106 and output the decrypted data 114.

Subsequent to detection of the first event 302, the key rolling event detector 118 at the first endpoint 102 and the key rolling event detector 118 at the second endpoint 104 detect second event 304 (a second key rolling event). Responsive to detection of the second event 304, key rolling is performed such that the encryption engine 110 obtains the second data encryption key 208 for use. The encryption engine 110 replaces the first data encryption key 204 with the second data encryption key 208. Subsequent to this replacement, the encryption engine 110 uses the second data encryption key 208 to encrypt or decrypt data. In the context of FIG. 1, for instance, the encryption engine 110 at the first endpoint 102 uses the second data encryption key 208 to encrypt data for communication over the communication link 106, and the encryption engine 110 at the second endpoint 104 uses the second data encryption key 208 to decrypt the data received via the communication link 106 and output the decrypted data 114.

Subsequent to detection of the second event 304, the key rolling event detector 118 at the first endpoint 102 and the key rolling event detector 118 at the second endpoint 104 detect third event 306 (a third key rolling event). Responsive to detection of the third event 306, key rolling is performed such that the encryption engine 110 obtains the third data encryption key 212 for use. The encryption engine 110 replaces the second data encryption key 208 with the third data encryption key 212. Subsequent to this replacement, the encryption engine 110 uses the third data encryption key 212 to encrypt or decrypt data. In the context of FIG. 1, for instance, the encryption engine 110 at the first endpoint 102 uses the third data encryption key 212 to encrypt data for communication over the communication link 106, and the encryption engine 110 at the second endpoint 104 uses the third data encryption key 212 to decrypt the data received via the communication link 106 and output the decrypted data 114.

Figure 4:
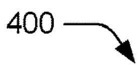
FIG. 4 depicts a procedure in an example implementation of rolling from a first data encryption key to a second date encryption key responsive to a key rolling event.
Figure 4:
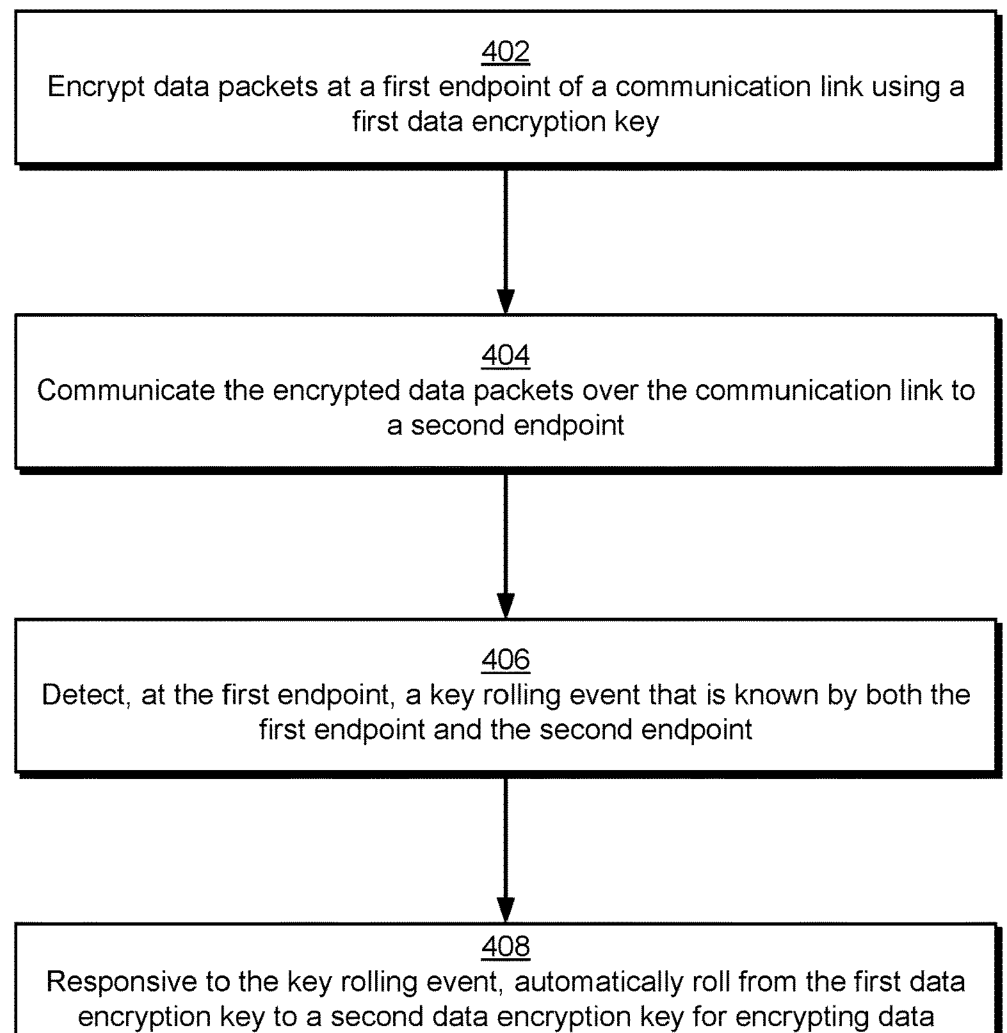

FIG. 4 depicts a procedure 400 in an example implementation of rolling from a first data encryption key to a second date encryption key responsive to a key rolling event.

Data packets are encrypted at a first endpoint of a communication link using a first data encryption key (block 402). By way of example, the first endpoint 102 receives data 108 for communication to the second endpoint 104. The encryption engine 110 at the first endpoint 102 encrypts the data 108 and authenticates it.

The encrypted data packets are communicated over the communication link to a second endpoint (block 404). By way of example, the first endpoint 102 (e.g., a transmitter of the first endpoint 102) transmits encrypted data packets 112 over the communication link 106 to the second endpoint 104.

A key rolling event that is known by both the first endpoint and the second endpoint is detected at the first endpoint (block 406). By way of example, the key rolling event detector 118 detects such key rolling events to initiate the key rolling. It is to be appreciated that the key rolling event detector 118 detects different events to initiate key rolling in various implementations. In one or more implementations, for example, the mutually prearranged event corresponds to a usage event, such as number of the encrypted data packets 112 communicated over the communication link 106. For example, the key rolling event detector 118 detects when a number of encrypted data packets communicated satisfies (e.g., is equal to or exceeds) a threshold number and initiates key rolling. In such scenarios, both the key rolling event detector 118 at the first endpoint 102 and the key rolling event detector 118 at the second endpoint 104 are programmatically configured to detect when the number of data packets communicated satisfies the threshold number and to initiate key rolling in response. Where the first endpoint 102 is the transmitting device and the second endpoint 104 is the receiving device, for instance, a counter of packets at the first endpoint 102 is incremented at transmission of an encrypted data packet 112 and a counter of packets at the second endpoint 104 is incremented at receipt of an encrypted data packet 112. Further, the key rolling event detector 118 at the first endpoint 102 detects when the number of packets transmitted as indicated by the counter of packets at the first endpoint 102 satisfies the threshold, and the key rolling event detector 118 at the second endpoint 104 detects when the number of packets received as indicated by the counter of packets at the second endpoint 104 satisfies the threshold.

Responsive to the key rolling event, the first data encryption key is automatically rolled to a second data encryption key for encrypting data packets communicated over the communication link (block 408). By way of example, responsive of detection of the key rolling event by the key rolling event detector 118, the data encryption key 126 used by the encryption engine 110 is replaced with a different data encryption key 126. In one or more implementations, the encryption engine 110 does not reuse data encryption keys 126. Instead, the encryption engine 110 obtains new a new data encryption key 126 from the storage 122, e.g., as generated by the key generator 120.

FIG. 5 depicts a procedure 500 in an example implementation of deterministically generating data encryption keys based on a first key derivation key.

A first key derivation key is received at a first endpoint and a second endpoint of a communication link (block 502). By way of example, the key derivation function 124 at the first endpoint 102 and the key derivation function 124 at the second endpoint 104 receive a first key derivation key 202. In one or more implementations, the first key derivation key 202 corresponds to a key provided by the encryption engine 110 based on establishing the communication link 106, e.g., a key used in conventional techniques for encrypting data communicated over the communication link 106.

A first data encryption key and a second key derivation key are generated at the first endpoint and the second endpoint by applying a key derivation function to the first key derivation key (block 504). By way of example, the key derivation function 124 at the first endpoint 102 generates and outputs a first data encryption key 204 and a second key derivation key 206, which the function derives based on the first key derivation key 202. Similarly, the key derivation function 124 at the second endpoint 104 generates and outputs the first data encryption key 204 and the second key derivation key 206, which the function derives based on the first key derivation key 202. In accordance with the described techniques, the first data encryption keys 204 generated by the key derivation function 124 at the first endpoint 102 and the second endpoint 104 match each other. The second key derivation keys 206 generated by the key derivation function 124 at the first endpoint 102 and the second endpoint 104 also match each other.

A second data encryption key and a third key derivation key is generated at the first endpoint and the second endpoint by applying the key derivation function to the second key derivation key (block 506). In accordance with the principles discussed herein, the first endpoint and the second endpoint are configured to roll from the first data encryption key to the second data encryption key responsive to detecting a key rolling event that is known by both the first endpoint and the second endpoint. By way of example, the key derivation function 124 at the first endpoint 102 and the second endpoint 104 generates and outputs a second data encryption key 208 and a third key derivation key 210, which the function derives based on the second key derivation key 206. In accordance with the described techniques, the second data encryption keys 208 generated by the key derivation function 124 at the first endpoint 102 and the second endpoint 104 match each other. The third key derivation keys 210 generated by the key derivation function 124 at the first endpoint 102 and the second endpoint 104 also match each other.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the first endpoint 102, the second endpoint 104, the communication link 106, the encryption engine 110, and the key rolling system 116) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:

encrypting data packets at a first endpoint of a communication link using a first data encryption key;

communicating the encrypted data packets over the communication link to a second endpoint;

detecting, at the first endpoint, a key rolling event that is known by both the first endpoint and the second endpoint, the key rolling event comprising communicating a threshold number of the encrypted data packets to the second endpoint; and responsive to detecting the key rolling event, rolling from the first data encryption key to a second data encryption key without communicating the second data encryption key between the first endpoint and second endpoint.

2. The method of claim 1, further comprising:

receiving, at the first endpoint, a first key derivation key; and generating, at the first endpoint, the first data encryption key and a second key derivation key by applying a key derivation function to the first key derivation key.

3. The method of claim 2, wherein the second endpoint also receives the first key derivation key and generates the first data encryption key and the second key derivation key by applying the key derivation function to the first key derivation key.

4. The method of claim 3, wherein the second data encryption key and a third key derivation key are generated at the first endpoint and the second endpoint responsive to detecting the key rolling event.

5. The method of claim 3, wherein the second data encryption key and a third key derivation key are generated at the first endpoint and the second endpoint prior to detecting the key rolling event.

6. The method of claim 3, wherein the second endpoint is configured to roll from the first data encryption key to the second data encryption key responsive to the key rolling event.

7. The method of claim 2, further comprising:

generating, at the first endpoint, the second data encryption key and a third key derivation key by applying the key derivation function to the second key derivation key.

8. The method of claim 7, wherein the second endpoint is configured to generate the second data encryption key and the third key derivation key by applying the key derivation function to the second key derivation key.

9. The method of claim 1, further comprising:

encrypting, at the first endpoint, data packets using the second data encryption key; and communicating the encrypted data packets encrypted using the second data encryption key to the second endpoint over the communication link.

10. The method of claim 1, wherein the detecting the key rolling event further comprises detecting that a number of flow control units of encrypted data packets communicated from the first endpoint to the second endpoint satisfies a threshold number.

11. A computing device comprising:

a key generator to generate data encryption keys for encrypting and decrypting data packets for communication between a first endpoint and a second endpoint via a communication link;

a key rolling event detector to detect a key rolling event, the key rolling event comprising communication of a threshold number of the encrypted data packets between the first endpoint and the second endpoint; and an encryption engine to roll from a current data encryption key generated by the key generator to a next data encryption key generated by the key generator, without communicating the next data encryption key between the first endpoint and the second endpoint, responsive to detection of the key rolling event by the key rolling event detector.

12. The computing device of claim 11, wherein instances of the key generator, the key rolling event detector, and the encryption engine are implemented at each of the first endpoint and the second endpoint.

13. The computing device of claim 12, wherein the key rolling event is known by the key rolling event detector at both the first endpoint and the second endpoint.

14. The computing device of claim 11, wherein responsive to the key rolling event detector detecting the key rolling event:

the encryption engine at the first endpoint encrypts data packets for communication over the communication link to the second endpoint using the next data encryption key; and the encryption engine at the second endpoint decrypts the encrypted data packets received from the first endpoint using the next data encryption key.

15. A method comprising:

receiving, at a first endpoint and a second endpoint of a communication link, a first key derivation key;

generating, at the first endpoint and the second endpoint, a first data encryption key and a second key derivation key by applying a key derivation function to the first key derivation key; and generating, at the first endpoint and the second endpoint, a second data encryption key and a third key derivation key by applying the key derivation function to the second key derivation key, wherein the first endpoint and the second endpoint are configured to roll from the first data encryption key to the second data encryption key, without communicating the second data encryption key between the first endpoint and the second endpoint, responsive to detecting a key rolling event that is known by both the first endpoint and the second endpoint, the key rolling event comprising receiving, at the first endpoint and from the second endpoint, a threshold number of data packets encrypted using the first data encryption key.

16. The method of claim 15, further comprising generating, at the first endpoint and the second endpoint, at least a third data encryption key by applying the key derivation function to the third key derivation key, wherein the first endpoint and the second endpoint are configured to roll from the second data encryption key to the third data encryption key responsive to detecting a subsequent key rolling event that is known by both the first endpoint and the second endpoint.

17. The method of claim 16, wherein the subsequent key rolling event comprises the first endpoint receiving the threshold number of data packets as encrypted using the third data encryption key.

18. The method of claim 16, wherein the key rolling event further comprises a threshold number of flow control units of encrypted data packets received by the first endpoint from the second endpoint.

19. The method of claim 15, wherein the second data encryption key and the third key derivation key are generated by the first endpoint and the second endpoint responsive to the key rolling event.

20. The method of claim 15, wherein the second data encryption key and the third key derivation key are generated by the first endpoint and the second endpoint prior to the key rolling event.

* * * * *